(12) United States Patent
Takemoto et al.

(10) Patent No.: US 12,297,121 B2
(45) Date of Patent: *May 13, 2025

(54) STANNOUS OXIDE POWDER AND METHOD FOR PRODUCING SAME

(71) Applicant: JX Advanced Metals Corporation, Tokyo (JP)

(72) Inventors: Koichi Takemoto, Ibaraki (JP); Toru Imori, Ibaraki (JP)

(73) Assignee: JX Advanced Metals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/652,609

(22) PCT Filed: Sep. 13, 2018

(86) PCT No.: PCT/JP2018/034052
§ 371 (c)(1),
(2) Date: Mar. 31, 2020

(87) PCT Pub. No.: WO2019/097831
PCT Pub. Date: May 23, 2019

(65) Prior Publication Data
US 2020/0231461 A1   Jul. 23, 2020

(30) Foreign Application Priority Data
Nov. 15, 2017   (JP) ................. 2017-220474

(51) Int. Cl.
*C01G 19/02*   (2006.01)
*B01J 14/00*   (2006.01)
(Continued)

(52) U.S. Cl.
CPC .............. *C01G 19/02* (2013.01); *B01J 14/00* (2013.01); *B01J 19/0006* (2013.01);
(Continued)

(58) Field of Classification Search
CPC ..................................................... C01G 19/02
See application file for complete search history.

(56) References Cited

U.S. PATENT DOCUMENTS 5,246,623 A * 9/1993 Giersberg ................. C09C 1/00
  423/618
9,067,800 B2   6/2015 Katase et al.
(Continued)

FOREIGN PATENT DOCUMENTS

CN   101367543 A   2/2009
CN   103043711 A   4/2013
(Continued)

OTHER PUBLICATIONS

Machine Translation JP 4975367 (Year: 2012).*
(Continued)

*Primary Examiner* — Hoa (Holly) Le
(74) *Attorney, Agent, or Firm* — Faegre Drinker Biddle & Reath LLP

(57) ABSTRACT

Provided is a method for producing stannous oxide, comprising a step of subjecting stannous sulfate to neutralization in an aqueous solution using ammonium carbonate or ammonium bicarbonate, and thereby precipitating stannous oxide. This production method is a novel means for producing stannous oxide in which chlorine, sulfur, sodium, and potassium are sufficiently reduced, and which has excellent solubility.

17 Claims, 4 Drawing Sheets

(51) Int. Cl.
B01J 19/00 (2006.01)
C25D 17/10 (2006.01)

(52) U.S. Cl.
CPC ....... *B01J 19/0013* (2013.01); *B01J 19/0086* (2013.01); *C01P 2004/03* (2013.01); *C01P 2004/61* (2013.01); *C01P 2006/11* (2013.01); *C01P 2006/12* (2013.01); *C01P 2006/82* (2013.01); *C25D 17/10* (2013.01)

(56) References Cited

U.S. PATENT DOCUMENTS

| | | | | |
|---|---|---|---|---|
| 11,772,981 | B2* | 10/2023 | Takemoto | C25D 3/30 423/618 |
| 11,981,581 | B2* | 5/2024 | Takemoto | C01G 19/02 |
| 2008/0032132 | A1* | 2/2008 | Woodfield | B22F 9/20 428/402 |
| 2012/0195822 | A1* | 8/2012 | Werner | C01G 19/02 423/618 |
| 2013/0084414 | A1* | 4/2013 | Grandbois | C01G 19/02 428/35.8 |
| 2013/0289133 | A1 | 10/2013 | Doshita et al. | |
| 2014/0079618 | A1 | 3/2014 | Katase et al. | |
| 2014/0127109 | A1 | 5/2014 | Katase et al. | |
| 2017/0009078 | A1* | 1/2017 | Katase | C23C 18/1617 |
| 2018/0327274 | A1* | 11/2018 | Hirano | C01G 19/02 |
| 2020/0231461 | A1 | 7/2020 | Takemoto et al. | |
| 2021/0047198 | A1* | 2/2021 | Takemoto | C01G 19/02 |
| 2021/0331934 | A1* | 10/2021 | Takemoto | C25D 3/30 |

FOREIGN PATENT DOCUMENTS

| | | |
|---|---|---|
| CN | 105813980 A | 7/2016 |
| CN | 106587139 A | 4/2017 |
| CN | 105813980 B | 8/2017 |
| CN | 107001065 A | 8/2017 |
| CN | 110997570 A | 4/2020 |
| CN | 111836781 A | 10/2020 |
| EP | 3070055 A1 | 9/2016 |
| EP | 3260420 A1 | 12/2017 |
| EP | 3712114 A1 | 9/2020 |
| EP | 3763677 A1 | 1/2021 |
| JP | 60221319 A | 11/1985 |
| JP | S6252130 A | 3/1987 |
| JP | 11310415 A | 11/1999 |
| JP | H11310415 A | 11/1999 |
| JP | 2007302496 A | 11/2007 |
| JP | 2009132570 A | 6/2009 |
| JP | 2009132571 A | 6/2009 |
| JP | 201251762 A | 3/2012 |
| JP | 4975367 B2 * | 7/2012 |
| JP | 2012236724 A | 12/2012 |
| JP | 201379186 A | 5/2013 |
| JP | 2016153361 A | 8/2016 |
| JP | 2016172885 A | 9/2016 |
| JP | 6095929 B2 | 3/2017 |
| TW | 1511928 B | 4/2012 |
| TW | 201704154 A | 2/2017 |
| WO | 2012096172 A1 | 7/2012 |
| WO | 2015133426 A1 | 9/2015 |
| WO | 2019171692 A1 | 9/2019 |

OTHER PUBLICATIONS

Translation CN-105668616 A (Year: 2016).*
Decision of Refusal from Korean Patent Office for corresponding KR Patent Application No. 10-2020-7002015 dated Nov. 16, 2021, 8 pages (including English translation).
Korean Office Action with Translation for KR 10-2020-7002015 related to PCT/JP2018/034052 dated May 11, 2021, 10 pages.
Extended European Search Report for corresponding EP 18877744.5 dated Dec. 11, 2020, 7 pages.
Extended European Search Report for related EP 19768694.2 corresponding to PCT/JP2019/015848, dated Mar. 18, 2022, 7 pages.
Chinese Office Action for the corresponding Chinese Patent Application No. 201880049513.8 dated Nov. 22, 2021 with translation, 16 pages.
Chinese Office Action for related Chinese Patent Application No. 201980001813.3 dated Dec. 6, 2021.
International Search Report for related PCT/JP2018/045006 dated Aug. 1, 2019, 4 pages.
Extended European Search Report for related EP Application No. 18909201.8 dated May 31, 2021, 6 pages.
Chinese Office Action for Chinese Patent Application No. 201880090566.4 for related U.S. Appl. No. 16/978,439, dated Apr. 18, 2022, 14 pages (with translation).
Chinese Office Action related to the corresponding Chinese Patent Application No. 201880049513.8 dated Jun. 21, 2022, with translation, 11 pages.
Chinese Office Action for corresponding Chinese patent application No. 201980001813.3 dated Jul. 15, 2022, with translation, 15 pages.
U.S. Office Action for related U.S. Appl. No. 16/494,021 dated Jan. 4, 2023, 30 pages.
Chinese Office Action for corresponding Chinese Patent Application No. 201880090566.4, dated Dec. 2, 2022, 8 pages (including translation).
Chinese Office Action for corresponding Chinese Patent Application No. 201880049513.8, dated Dec. 13, 2022, 11 pages (including translation).
JP Office Action with English Translation for corresponding JP Patent Application No. 2020-504792 dated Oct. 5, 2022, 4 pages.
Chinese Office Action for related Chinese Patent Application No. 201980001813.3 dated Aug. 11, 2023 with Translation, 7 pages.
U.S. Office Action issued in corresponding case U.S. Appl. No. 16/978,439 dated Sep. 6, 2023, 65 pages.
Chinese Office Action for corresponding Chinese Patent Application No. 201880049513.8 dated May 26, 2023 with Translation, 10 pages.
Chinese Office Action for the corresponding Chinese Patent Application No. 201980001813.3 dated Mar. 31, 2023 with Translation, 11 pages.
Chinese Office Action for corresponding Chinese Patent Application No. 201880090566.4 with translation, dated Apr. 1, 2023, 8 pages.

* cited by examiner

[FIG. 1A]

[FIG. 1B]
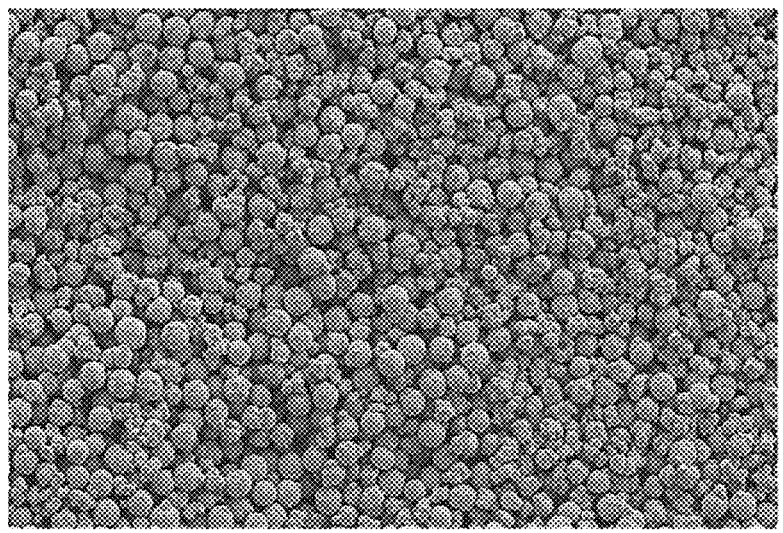

[FIG. 2A]
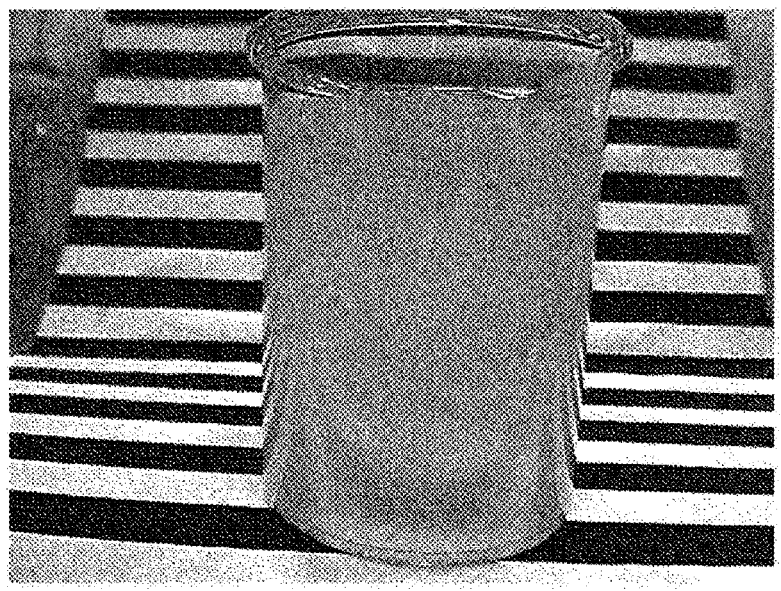

[FIG. 2B]
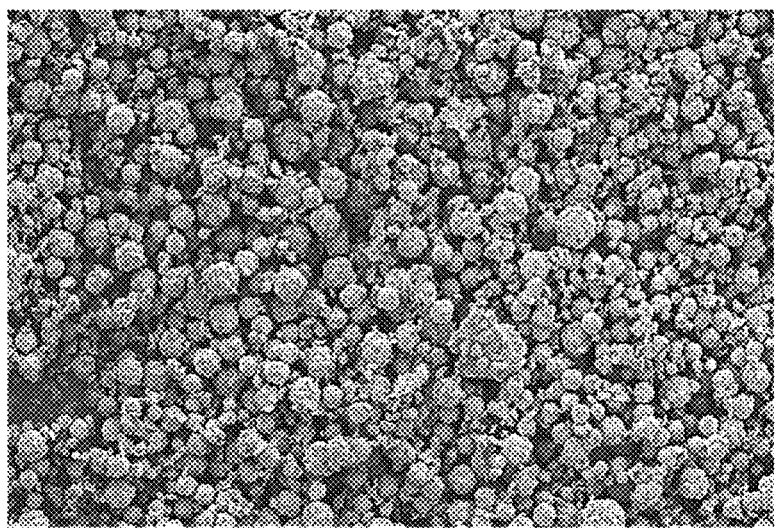

STANNOUS OXIDE POWDER AND METHOD FOR PRODUCING SAME

TECHNICAL FIELD

The present invention relates to stannous oxide powder and a method for producing the same.

BACKGROUND ART

When performing tin plating, an insoluble electrode (platinum, noble metal oxide, or the like) may be used in place of metallic tin as a positive electrode. In this case, stannous oxide is often added as a supplement for tin ions that are consumed from an electrolyte. Stannous oxide (SnO) has a higher dissolution rate than that of stannic oxide ($SnO_2$), and can allow easy production of a supplying solution.

Conventionally, tin chloride is preferably used as a starting material in order to produce soluble stannous oxide. Thus, for example, Patent Document 1 (Japanese Patent No. 6095929 B) discloses a technique for producing stannous oxide using tin chloride as a raw material. However, this technique has a disadvantage that it is difficult to reduce chlorine sufficiently, which is an impurity contained in the produced stannous oxide. Therefore, for example, in tin-silver plating, there is a need for sufficiently reducing chlorine as a source of tin ion supply because if chlorine is present in the plating, the chlorine reacts with silver and precipitates as silver chloride having lower solubility, resulting in a change of the bath composition.

Patent Document 2 (Japanese Patent Application Publication No. 2016-153361 A) discloses a technique for producing stannous oxide from stannous chloride or stannous sulfate as a raw material. However, this technique has a disadvantage that it is difficult to sufficiently reduce chloride ions or sulfate ions derived from a tin solution as a raw material in the produced stannous oxide. In a tin material for semiconductors there is a need for sufficient reduction of chlorine and sulfur as impurities.

Patent Document 3 (Japanese Patent No. 4975367 B) produces stannous oxide by electrolysis of tin as an anode using an aqueous ammonium nitrate solution containing an organic sulfonic acid as an electrolytic solution.

CITATION LIST

Patent Literatures

Patent Document 1: Japanese Patent No. 6095929 B
Patent Document 2: Japanese Patent Application Publication No. 2016-153361 A
Patent Document 3: Japanese Patent No. 4975367 B

SUMMARY OF INVENTION

Technical Problem

According to studies by the present inventors, the production method of Patent Document 3 resulted in insufficient reduction of impurities (chlorine, sulfur, sodium, and potassium) in the resulting stannous oxide.

Thus, there is a need for a technique for producing stannous oxide having excellent solubility while sufficiently reducing chlorine, sulfur, sodium, and potassium.

Therefore, an object of the present invention is to provide a novel means for producing stannous oxide having excellent solubility while sufficiently reducing chlorine, sulfur, sodium, and potassium.

Solution to Problem

As a result of intensive studies to solve the above problems, the present inventors have found that a production method as described later can sufficiently produce stannous oxide having excellent solubility while sufficiently reducing chlorine, sulfur, sodium, and potassium, and has arrived at the present invention.

Therefore, the present invention includes the following aspects (1) to (16):

(1)
A method for producing stannous oxide, the method comprising a step of subjecting stannous sulfate to a neutralization reaction with ammonium carbonate or ammonium bicarbonate in an aqueous solution to deposit stannous oxide.

(2)
The method according to (1), wherein the neutralization reaction is carried out in an aqueous solution having a pH in a range of from pH 6.0 to pH 8.0.

(3)
The method according to (1) or (2), wherein the neutralization reaction is carried out by adding an aqueous stannous sulfate solution to an aqueous ammonium bicarbonate solution.

(4)
The method according to (3), wherein a concentration of ammonium bicarbonate in the aqueous ammonium bicarbonate solution is in a range of from 50 to 150 g/L.

(5)
The method according to (3) or (4), wherein a concentration of tin in the aqueous stannous sulfate solution is in a range of from 10 to 130 g/L.

(6)
The method according to any one of (1) to (5), wherein the step of subjecting stannous sulfate to the neutralization reaction to deposit stannous oxide comprises: subjecting stannous sulfate to the neutralization reaction at a temperature in a range of from 50 to 80° C.; and then maintaining the aqueous solution subjected to the neutralization reaction at a temperature in a range of from 60 to 100° C. to deposit stannous oxide.

(7)
The method according to any one of (1) to (5), wherein the step of subjecting stannous sulfate to the neutralization reaction to deposit stannous oxide comprises: subjecting stannous sulfate to the neutralization reaction at a temperature in a range of from 50 to 80° C. for 1 to 10 hours; and then maintaining the aqueous solution subjected to the neutralization reaction at a temperature in a range of from 60 to 100° C. for 1 to 10 hours to deposit stannous oxide.

(8)
A stannous oxide, the stannous oxide comprising stannous oxide and inevitable impurities, the stannous oxide having a stannous oxide content of 99.99% by mass or more, and satisfying either:
a chlorine content of 1 ppm or less; or
a sulfur content of less than 10 ppm.

(9)
The stannous oxide according to (8), wherein the chlorine content is 1 ppm or less and the sulfur content is less than 10 ppm.

(10)

The stannous oxide according to (8) or (9), wherein the stannous oxide has a sodium content of less than 5 ppm and a potassium content of less than 5 ppm.

(11)

The stannous oxide according to any one of (8) to (10), wherein the stannous oxide has an antimony content of 5 ppm or less.

(12)

The stannous oxide according to any one of (8) to (11), wherein the stannous oxide is in a form of powder.

(13)

The stannous oxide according to (12), wherein the powder has a water content in a range of from 1 to 10% by weight.

(14)

The stannous oxide according to (12) or (13), wherein the powder has a specific surface area in a range of from 0.1 to 1.0 m$^2$/g.

(15)

The stannous oxide according to any one of (12) to (14), wherein the powder has a TAP density in a range of from 1.0 to 4.0 g/cm$^3$.

(16)

The stannous oxide according to any one of (12) to (15), wherein the powder has a 50% particle diameter (D50) in a range of from 20 to 60 μm.

Advantageous Effects of Invention

According to the present invention, a stannous oxide having excellent solubility can be produced while sufficiently reducing chlorine, sulfur, sodium, and potassium.

BRIEF DESCRIPTION OF DRAWINGS

FIG. 1A is a photograph showing a result of a solubility test of stannous oxide according to Example 4.

FIG. 1B is a photograph showing a scanning electron microscope (SEM) image of stannous oxide according to Example 4.

FIG. 2A is a photograph showing a result of a solubility test of stannous oxide according to Comparative Example 4.

FIG. 2B is a photograph showing a SEM image of stannous oxide according to Comparative Example 4.

DESCRIPTION OF THE PREFERRED EMBODIMENTS

The present invention will be described in detail below with reference to embodiments. The present invention is not limited to the specific embodiments described below.

[Production of Stannous Oxide]

Production of a stannous oxide according to the present invention can be carried out by a method comprising a step of subjecting stannous sulfate to a neutralization reaction with ammonium carbonate or ammonium bicarbonate in an aqueous solution to deposit stannous oxide.

[Neutralization Reaction]

The neutralization reaction is carried out by allowing stannous sulfate to react with ammonium carbonate or ammonium bicarbonate in an aqueous solution. In a preferred embodiment, the neutralization reaction is carried out by adding an aqueous stannous sulfate solution to an aqueous ammonium carbonate or ammonium bicarbonate solution. In a preferred embodiment, the aqueous stannous sulfate solution can be added by a known means, for example, a means such as dropping, jetting, or spraying.

Alternatively, in a preferred embodiment, the neutralization reaction can be carried out by simultaneously or alternately adding a stannous sulfate solution and an aqueous ammonium carbonate or ammonium bicarbonate solution to water or an aqueous solution. These additions can also be carried out by dropping. In a preferred embodiment, the aqueous solution is stirred as needed during the neutralization reaction. The stirring can be carried out by a known means.

The neutralization reaction can be allowed to proceed by adding aqueous ammonia and/or blowing a carbon dioxide gas into the aqueous solution in addition to ammonium carbonate or ammonium bicarbonate. The addition of the aqueous ammonia can be carried out such that the concentration of ammonium ions in the aqueous solution containing the aqueous ammonium will be an ammonium ion concentration based on a range of an ammonium bicarbonate concentration as described below, together with the ammonium ions derived from ammonium bicarbonate. The blowing of the carbon dioxide gas can be carried out such that the sum of the concentrations of the carbonate ions and the hydrogen carbonate ions in the aqueous solution into which the carbon dioxide gas has been blown will be the sum of concentrations of carbonate ions and hydrogen carbonate ions based on a range of an ammonium bicarbonate concentration as described below, together with the carbonate ions and the hydrogen carbonate ions derived from the ammonium bicarbonate. The blowing of the carbon dioxide gas can be carried out using a known means. The addition of the aqueous ammonia water and/or the blowing of the carbon dioxide gas can be carried out in combination with a pH adjustment as described later.

[pH]

In a preferred embodiment, the neutralization reaction is carried out in an aqueous solution having a pH, for example in a range of from pH 6.0 to pH 8.0, and preferably in a range of from pH 7.0 to pH 8.0. The pH can be adjusted, for example, by adding ammonium carbonate, ammonium bicarbonate, or aqueous ammonia. Alternatively, the pH may be adjusted by blowing carbon dioxide into the reaction solution. The pH value is preferably maintained in the above range through two stage temperature adjustment as described later.

[Reaction Temperature and Time]

In a preferred embodiment, the temperature of the solution subjected to the neutralization reaction is adjusted in two stages. That is, the reaction temperature is adjusted in two stages: a temperature at which the neutralization reaction is allowed to proceed by dropping the stannous sulfate solution and the aqueous ammonium carbonate or ammonium bicarbonate solution (a first stage reaction temperature); and a temperature at which the neutralization reaction is maintained after the end of the dropping (a second stage reaction temperature). The temperature during dropping, i.e., the first stage temperature can be from 50 to 80° C., preferably 50 to 70° C., more preferably 50 to 60° C. The dropping time, i.e., a retention time of the first stage temperature can be from 1 to 10 hours, preferably from 2 to 5 hours, more preferably 2 to 4 hours, for example. The retention temperature after dropping, i.e., the second stage temperature, can be from 60 to 100° C., preferably from 70 to 90° C., more preferably from 70 to 80° C., for example. The retention time after dropping, i.e., the retention time of the second stage temperature can be from 1 to 10 hours, preferably from 1 to 4 hours, more preferably 1 to 2 hours, for example.

[Ammonium Bicarbonate Concentration]

When the aqueous ammonium bicarbonate solution is used in the neutralization reaction, a concentration of ammonium bicarbonate can be, for example, in a range of from 50 to 150 g/L, preferably from 70 to 120 g/L. When the aqueous ammonium carbonate solution is used in the neutralization reaction, it can be suitably used in the same concentration range as that of ammonium bicarbonate.

[Tin Concentration]

When the aqueous stannous sulfate solution is used in the neutralization reaction, a concentration of tin in the aqueous stannous sulfate solution can be, for example, in a range of from 10 to 130 g/L, preferably from 10 to 100 g/L, more preferably from 20 to 90 g/L.

[Deposition of Stannous Oxide]

By the neutralization reaction, stannous oxide is deposited and precipitated. The resulting precipitate can be subjected to solid-liquid separation to obtain stannous oxide powder. The solid-liquid separation can be carried out by a known means such as suction, squeeze filtration, decantation, and centrifugation. The stannous oxide powder may be washed as desired, for example, in combination with a separating means such as centrifugation.

[Stannous Oxide]

Stannous oxide (SnO) obtained by the present invention is composed of stannous oxide and inevitable impurities, and can have, for example, a stannous oxide content of 99.99% by mass or more, preferably 99.995% by mass or more, for example, in a range of from 99.99 to 99.995% by mass, preferably from 99.99 to 99.999% by mass. The content of impurities as described later can be determined by means of an ICP mass spectrometer (commonly known as ICP-MS), an ICP optical emission spectrometer (commonly known as ICP-OES), a flame atomic absorption spectrometer (commonly known as AAS), and a chlorine/sulfur analyzer/total organic halogen analyzer (commonly known as TOX), and by a carbon/sulfur analyzer (commonly known as LECO) for S.

[Cl Content]

In a preferred embodiment, a Cl content (chlorine content) of the stannous oxide can be, for example, less than 5 ppm, and preferably less than 1 ppm, and more preferably less than 1 ppm. The stannous oxide according to the present invention can allow a significantly decreased Cl content because the use of a hydrochloric acid-based aqueous solution is avoided in the production.

[S Content]

In a preferred embodiment, a S content (sulfur content) of the stannous oxide can be, for example, less than 20 ppm, and preferably 10 ppm or less. The stannous oxide according to the present invention can allow a significantly decreased S content despite the use of the aqueous sulfate solution in the production.

[Na Content and K Content]

In a preferred embodiment, a Na content (sodium content) of the stannous oxide can be, for example, less than 5 ppm, and preferably less than 1 ppm. In a preferred embodiment, a K content (potassium content) of the stannous oxide can be, for example, less than 5 ppm, and preferably less than 1 ppm. The stannous oxide according to the present invention can allow significantly decreased Na and K contents because the use of sodium-containing materials and potassium-containing materials is avoided in the production.

[Impurity Content]

In a preferred embodiment, the impurities in the stannous oxide can have the following contents, as contents measured by ICP-MS (SPQ9700 from Hitachi High-Tech Science Co., Ltd.) for Ag, As, Bi, Cd, Cr, Cu, In, Mg, Mn, Pb, Sb, Th, Tl, U and Zn; by ICP-OES (SPS3500DD from Hitachi High-Tech Science Co., Ltd.) for Ca, Co, Fe, Ni, and P; by AAS (AA240FS from Agilent Technologies) for K and Na; by TOX (TOX-2100H from Mitsubishi Chemical Analytech Co., Ltd.) for Cl; and by LECO (CSLS600 from LECO JAPAN CORPORATION) for S:

The Ag content is 1 ppm or less, preferably less than 1 ppm (less than the detection limit); the As content is 1 ppm or less, preferably less than 1 ppm (less than the detection limit); the Bi content is less than 1 ppm, preferably less than 1 ppm (less than the detection limit); the Ca content is 1 ppm or less, preferably less than 1 ppm (less than the detection limit); the Cd content is 1 ppm or less, preferably less than 1 ppm (less than the detection limit); the Co content is 1 ppm or less, preferably less than 1 ppm (less than the detection limit); the Cr content is 1 ppm or less, preferably less than 1 ppm (less than the detection limit); the Cu content is 1 ppm or less, preferably less than 1 ppm (less than the detection limit); the Fe content is 1 ppm or less, preferably less than 1 ppm (less than the detection limit); the In content is 1 ppm or less, preferably less than 1 ppm (less than the detection limit); the K content is less than 5 ppm, preferably 1 ppm or less, more preferably less than 1 ppm (less than the detection limit); the Mg content is 1 ppm or less, preferably less than 1 ppm (less than detection limit); the Mn content is 1 ppm or less, preferably less than 1 ppm (less than detection limit); the Na content is less than 5 ppm, preferably 1 ppm or less, more preferably less than 1 ppm (less than the detection limit); the P content is 10 ppm or less, preferably less than 10 ppm (less than the detection limit); the Ni content is 1 ppm or less, preferably less than 1 ppm (less than detection limit); the Pb content is 1 ppm or less, preferably less than 1 ppm (less than detection limit); the Th content is 1 ppm or less, preferably less than 1 ppm (less than the detection limit); the Tl content is 1 ppm or less, preferably less than 1 ppm (less than the detection limit); the U content is 1 ppm or less, preferably less than 1 ppm (less than the detection limit); the Zn content is 1 ppm or less, preferably less than 1 ppm (less than the detection limit); and the Sb content is 5 ppm or less, preferably 2 ppm or less, more preferably 1.6 ppm or less, alternatively 0.1 ppm or more, preferably 0.5 ppm or more, more preferably 1.0 ppm or more.

[Shape of Stannous Oxide]

In a preferred embodiment, the stannous oxide can be in the form of powder. A secondary particle of the powder (stannous oxide powder) has, for example, a spherical shape and a combined shape thereof.

[Water Content]

In a preferred embodiment, the stannous oxide powder can have a water content in a range of, for example, from 1 to 10% by weight, and preferably from 1 to 5% by weight. As used herein, the water content can be measured by weight loss due to drying.

[Specific Surface Area]

In a preferred embodiment, the stannous oxide powder can have a specific surface area of, for example, from 0.1 to 1.0 m$^2$/g, preferably from 0.1 to 0.9 m$^2$/g, more preferably 0.2 to 0.5 m$^2$/g. As used herein, the specific surface area can be measured by Monosorb MS-21 from QUANTA CHROME.

[TAP Density]

In a preferred embodiment, the stannous oxide powder can have a TAP density, for example in a range of from 1.0 to 4.0 g/cm$^3$, preferably from 2.0 to 3.0 g/cm$^3$. As used herein, the TAP density can be measured by TAPDENSER KYT-4000K from SEISHIN ENTERPRISES Co., Ltd.

[50% Particle Diameter (D50)]

In a preferred embodiment, the stannous oxide powder can have a 50% particle diameter (D50), for example in a range of from 20 to 60 μm, preferably from 40 to 60 μm, or from 30 to 50 μm, more preferably from 40 to 60 μm. As used herein, the 50% particle diameter (D50) can be measured by MT3300EX2 from MicrotracBEL Corp.

[Solubility]

The stannous oxide powder according to the present invention has excellent solubility and can be suitably used for supplying a plating solution. The solubility as used herein refers to solubility in a methanesulfonic acid solution. The solubility can be determined as solubility under conditions of Examples as described later. In a preferred embodiment, particularly excellent solubility can refer to a case where the dissolution time is preferably 20 seconds or less, more preferably 10 seconds or less. An index of the solubility can be a turbidity after dissolving tin oxide in methanesulfonic acid and allowing it to stand for 5 minutes in the dissolved state. The turbidity is "20 degrees" in pure water (colorless and transparent), and the maximum value is "500 degrees". As shown in Examples as described later, in a preferred embodiment, the turbidity of the solution of the dissolved stannous oxide according to the present invention can be "20 degrees". The turbidity can be measured with a turbidity meter, and examples of the turbidity meter include a digital turbidity meter 500G (model TB-500G) from Kyoritsu Chemical-Check Lab., Corp.

EXAMPLES

Hereinafter, the present invention will be described in more detail with reference to Examples. The present invention is not limited to the following Examples.

Example 1

[Production of Stannous Oxide]

1 L of an aqueous 100 g/L ammonium bicarbonate solution was placed in a 3 L beaker, heated and maintained at 65 to 70° C., and 1 L of a stannous sulfate solution having a tin concentration of 80 g/L was dropped over 2 hours to the aqueous ammonium bicarbonate solution with stirring by a stirrer, thereby carrying out a neutralization reaction (a first stage). After the reaction, the temperature was further raised to 75 to 80° C. and maintained for 1 hour (a second stage). The temperature during the reaction was maintained for a certain period of time in two stages: the first stage and the second stage as described above. During the neutralization reaction, the dissolved ammonium bicarbonate solution was added for pH adjustment. Table 1 summarizes the details of the conditions. Particulate stannous oxide was thus obtained. The reaction formula for the neutralization reaction is shown below:

$$SnSO_4 + 2(NH_4)HCO_3 \rightarrow SnO + (NH_4)_2SO_4 + H_2O + 2CO_2.$$

[Evaluation of Stannous Oxide]

The resulting particulate stannous oxide was evaluated as follows.

The impurity content was analyzed using ICP-MS, ICP-OES, AAS, TOX, LECO and the like.

The water content was analyzed using a dryer and an electronic balance.

The specific surface area was measured using Monosorb MS-21 from QUANTA CHROME.

The TAP density was measured using TAPDENSER KYT-4000K from SEISHIN ENTERPRISE CO., LTD.

The particle diameter was measured by MT3300EX2 from MicrotrackBEL Co., Ltd.

The results obtained are summarized in Table 1.

[Solubility]

The solubility of the resulting particulate stannous oxide was evaluated by determining a dissolution time as follows: 7.5 mL of 96% methanesulfonic acid was collected and dilute to 50 mL with pure water.

Stannous oxide (5.0 g) was rapidly introduced into an aqueous methanesulfonic acid solution in a 50 mL beaker, and the time from introduction to dissolution was measured while stirring the solution with a stirrer at 500 rpm. The solution temperature at this time was 23° C. Based on visual observation that black turbidity became colorless and transparent, it was determined that the dissolution was completed, and the time was measured. The results obtained are summarized in Table 1. Further, turbidity after dissolving tin oxide in methanesulfonic acid and allowing it to stand for 5 minutes was measured with a digital turbidity meter 500G (model TB-500G) from KYORITSU CHEMICAL-CHECK Lab., Corp. These results are also shown in FIG. 1.

Examples 2 to 6

Examples 2 to 6 were carried out according to the same procedure as that of Example 1. Details of the conditions are summarized in Table 1. In Examples 2, 5 and 6, a carbon dioxide gas was blown simultaneously with the introduction of the aqueous ammonium bicarbonate solution. In Example 2, aqueous ammonium was further added simultaneously with the introduction of the aqueous ammonium bicarbonate solution. The resulting particulate stannous oxide was evaluated according the same manners as those of Example 1. The same is true for the solubility test. The results obtained are summarized in Table 1. FIG. 1A shows a photograph of the appearance of the solution at the time when it was determined that the dissolution was completed, for Example 4.

[SEM Image]

The resulting particulate stannous oxide was observed by SEM (Electron Microscope S-3000N from Hitachi High-Technologies Corporation). A SEM image of the stannous oxide powder for Example 4 is shown in FIG. 1B.

Comparative Example 1

The neutralization reaction was carried out in the same manner as that of Example 1 with the exception that 1 L of a solution of stannous sulfate solution in hydrochloric acid having a tin concentration of 100 g/L was dropped instead of 1 L of the stannous sulfate solution. Table 1 summarizes the details of the conditions. The resulting particulate stannous oxide was evaluated in the same manner as that of Example 1. The same is true for the solubility test. Table 1 summarizes the obtained results.

Comparative Examples 2 to 4

The neutralization reaction was carried out in the same manner as that of Example 1 except for the conditions as shown in Table 1. Table 1 summarizes the details of the conditions. The resulting flaky stannous oxide was evaluated in the same manner as that of Example 1. The same is true for the solubility test. Table 1 summarizes the obtained results. FIG. 2A shows a photograph of the appearance of the solution at the time when it was determined that the dissolution was completed, for Comparative Example 4. FIG. 2B shows a photograph of an SEM image of the particulate stannous oxide obtained for Comparative Example 4.

TABLE 1

| Example/Comp. | pH | Reaction Temperature | Addition Time | Reaction Reagent | Impurity 1 (Lower Quantification Limit or less) |
|---|---|---|---|---|---|
| Example 1 | 7.0-7.5 | First Stage 65-70° C. Second Stage 75-80° C. | First Stage 2 hours Second Stage 1 hour | 100 g/L Ammonium Bicarbonate | Ag, As, Bi, Ca, Cd, Co, Cr, Cu, Fe, In, K, Mg, Mn, Na, Ni, Pb, Th, Tl, U, Zn < 1 ppm P < 10 ppm Cl < 1 ppm |
| Example 2 | 6.5-7.0 | First Stage 65-70° C. Second Stage 75-80° C. | First Stage 3 hours Second Stage 2 hours | 100 g/L Ammonium Bicarbonate + 1N Aqueous Ammonia + 1 L/min Carbon Dioxide | Same as above |
| Example 3 | 6.0-6.5 | First Stage 55-60° C. Second Stage 75-80° C. | First Stage 4 hours Second Stage 1 hour | 100 g/L Ammonium Bicarbonate | Same as above |
| Example 4 | 6.5-7.0 | First Stage 55-60° C. Second Stage 75-80° C. | First Stage 2 hours Second Stage 1 hour | 100 g/L Ammonium Bicarbonate | Same as above |
| Example 5 | 6.0-6.5 | First Stage 50-50° C. Second Stage 70-75° C. | First Stage 3 hours Second Stage 2 hours | 100 g/L Ammonium Bicarbonate + 1 L/min Carbon Dioxide | Same as above |
| Example 6 | 6.0-6.5 | First Stage 55-60° C. Second Stage 75-80° C. | First Stage 3 hours Second Stage 2 hours | 100 g/L Ammonium Bicarbonate + 1 L/min Carbon Dioxide | Ag, As, Bi, Cd, Co, Cr, Cu, Fe, In, K, Mg, Mn, Na, Ni, Pb, Th, Tl, U, Zn < 1 ppm P, S < 10 ppm Cl < 1 ppm |
| Comp. 1 | 6.0-6.5 | First Stage 65-70° C. Second Stage 75-80° C. | First Stage 2 hours Second Stage 1 hour | 100 g/L Ammonium Bicarbonate | Ag, As, Bi, Ca, Cd, Co, Cr, Cu, Fe, In, K, Mg, Mn, Na, Ni, Pb, Th, Tl, U, Zn < 1 ppm P, S < 10 ppm |
| Comp. 2 | 5.0-5.5 | First Stage 65-70° C. Second Stage 75-80° C. | First Stage 2 hours Second Stage 1 hour | 100 g/L Ammonium Bicarbonate | Ag, As, Bi, Ca, Cd, Co, Cr, Cu, Fe, In, K, Mg, Mn, Na, Ni, Pb, Th, Tl, U, Zn < 1 ppm P < 10 ppm |
| Comp. 3 | 6.0-6.5 | First Stage 40-45° C. Second Stage 50-55° C. | First Stage 2 hours Second Stage 1 hour | 100 g/L Ammonium Bicarbonate | Same as above |
| Comp. 4 | 6.0-6.5 | First Stage 65-70° C. Second Stage 75-80° C. | First Stage 16 hours Second Stage 1 hour | 100 g/L Ammonium Bicarbonate | Same as above |

| Example/Comp. | Impurity 2 (Detection Quality) | Water Content (wt %) | Specific Surface Area | TAP Density (g/cm$^3$) | Particle Diameter 50% (μm) | Dissolution Time and Turbidity |
|---|---|---|---|---|---|---|
| Example 1 | Sb: 1.6 ppm | 3 | 0.17 | 2.4 | 50.9 | 15 seconds 20 degrees |
| Example 2 | Sb: 1.6 ppm | 3 | 0.14 | 2.8 | 39.8 | 8 seconds 20 degrees |
| Example 3 | Sb < 1 ppm | 6 | 0.42 | 2.8 | 41.5 | 10 seconds 20 degrees |
| Example 4 | Sb: 1.3 ppm | 4 | 0.44 | 2.8 | 29.5 | 8 seconds 20 degrees |
| Example 5 | Sb: 1.3 ppm | 3 | 0.61 | 2.8 | 42.2 | 8 seconds 20 degrees |
| Example 6 | Ca: 1 ppm Sb: 1.6 ppm | 3 | 0.52 | 2.8 | 49.2 | 13 seconds 20 degrees |
| Comp. 1 | Cl: 92 ppm Sb: 1.2 ppm | 6 | 0.34 | 2.8 | 34.7 | 20 seconds 20 degrees |
| Comp. 2 | S: 25 ppm Sb: 1.8 ppm | 11 | 0.55 | 2.4 | 48.7 | 15 seconds 20 degrees |
| Comp. 3 | S: 40 ppm Sb: 1.6 ppm | 23 | 1.57 | 2.3 | 17.7 | 40 seconds 20 degrees |

TABLE 1-continued

| Comp. 4 | S: 20 ppm<br>Sb: 1.1 ppm | 8 | 3.08 | 2.4 | 52.2 | 60 seconds<br>Not Dissolved |

[Result]

Examples 1 to 6 were completely colorless and transparent after dissolution in the aqueous methanesulfonic acid solution, and it could be confirmed from the results of impurity analysis that they had very high purity. Comparative Examples 1 to 3 were also colorless and transparent after dissolution, but each contained a large amount of impurities. In Comparative Example 4, the solubility of stannous oxide in the aqueous methanesulfonic acid solution was poor, and it remained in an opaque state with no change after 60 seconds, and the state remained after 5 minutes, and a turbidity measured for reference was 180 degrees.

INDUSTRIAL APPLICABILITY

According to the present invention, it is possible to produce stannous oxide having excellent solubility while sufficiently reducing chlorine, sulfur, sodium, and potassium. The present invention is industrially useful.

What is claimed is:

1. A stannous oxide consisting of a stannous oxide content of 99.99% by mass or more, a chlorine content of 1 ppm or less, and optionally sulfur, sodium, potassium, and antimony.

2. The stannous oxide according to claim 1, wherein the chlorine content is 1 ppm or less and the sulfur content is less than 10 ppm.

3. A stannous oxide powder comprising the stannous oxide according to claim 2.

4. The stannous oxide according to claim 1, wherein the stannous oxide has a sodium content of less than 5 ppm and a potassium content of less than 5 ppm.

5. A stannous oxide powder comprising the stannous oxide according to claim 4.

6. The stannous oxide according to claim 1, wherein the stannous oxide has an antimony content of 5 ppm or less.

7. A stannous oxide powder comprising the stannous oxide according to claim 6.

8. A stannous oxide powder comprising the stannous oxide according to claim 1.

9. The stannous oxide according to claim 8, wherein the powder has a water content in a range of from 1 to 10% by weight.

10. The stannous oxide according to claim 8, wherein the powder has a specific surface area in a range of from 0.1 to 1.0 m²/g.

11. The stannous oxide according to claim 8, wherein the powder has a TAP density in a range of from 1.0 to 4.0 g/cm³.

12. The stannous oxide according to claim 8, wherein the powder has a 50% particle diameter (D50) in a range of from 20 to 60 µm.

13. A method for producing stannous oxide according to claim 1, the method comprising a step of subjecting stannous sulfate to a neutralization reaction with ammonium carbonate or ammonium bicarbonate in an aqueous solution to deposit stannous oxide, wherein the neutralization reaction is carried out in an aqueous solution having a pH in a range of from pH 6.0 to pH 8.0, wherein the step of subjecting stannous sulfate to the neutralization reaction to deposit stannous oxide comprises:

subjecting stannous sulfate to the neutralization reaction at a temperature in a range of from 50 to 80° C.; and then maintaining the aqueous solution subjected to the neutralization reaction at a temperature in a range of from 60 to 100° C. to deposit stannous oxide.

14. The method according to claim 1, wherein the step of subjecting stannous sulfate to the neutralization reaction to deposit stannous oxide comprises:

subjecting stannous sulfate to the neutralization reaction at a temperature in a range of from 50 to 80° C. for 1 to 10 hours; and then maintaining the aqueous solution subjected to the neutralization reaction at a temperature in a range of from 60 to 100° C. for 1 to 10 hours to deposit stannous oxide.

15. The method according to claim 13, wherein the neutralization reaction is carried out by adding an aqueous stannous sulfate solution to an aqueous ammonium bicarbonate solution.

16. The method according to claim 15, wherein a concentration of ammonium bicarbonate in the aqueous ammonium bicarbonate solution is in a range of from 50 to 150 g/L.

17. The method according to claim 15, wherein a concentration of tin in the aqueous stannous sulfate solution is in a range of from 10 to 130 g/L.

* * * * *